(12) United States Patent
Frenger et al.

(10) Patent No.: US 9,485,754 B2
(45) Date of Patent: Nov. 1, 2016

(54) METHODS AND DEVICES FOR CARRIER AGGREGATION IN A WIRELESS COMMUNICATION SYSTEM

(75) Inventors: Pål Frenger, Linköping (SE);
Jiann-Ching Guey, Hsinchu (TW);
Havish Koorapaty, Saratoga, CA (US)

(73) Assignee: TELEFONAKTIEBOLAGET L M ERICSSON, Stockholm (SE)

( * ) Notice: Subject to any disclaimer, the term of this patent is extended or adjusted under 35 U.S.C. 154(b) by 0 days.

(21) Appl. No.: 14/399,460

(22) PCT Filed: May 28, 2012

(86) PCT No.: PCT/SE2012/050570
§ 371 (c)(1),
(2), (4) Date: Nov. 6, 2014

(87) PCT Pub. No.: WO2013/180607
PCT Pub. Date: Dec. 5, 2013

(65) Prior Publication Data
US 2015/0092653 A1    Apr. 2, 2015

(51) Int. Cl.
*H04W 72/04*    (2009.01)
*H04W 72/12*    (2009.01)
(Continued)

(52) U.S. Cl.
CPC ............... *H04W 72/04* (2013.01); *H04W 4/06* (2013.01); *H04W 72/1215* (2013.01); *H04L 12/189* (2013.01)

(58) Field of Classification Search
CPC . H04W 72/04; H04W 72/1215; H04W 4/06; H04L 12/189
See application file for complete search history.

(56) References Cited

U.S. PATENT DOCUMENTS

2011/0081913 A1    4/2011    Lee et al.
2011/0103243 A1    5/2011    Larsson et al.
(Continued)

FOREIGN PATENT DOCUMENTS

WO    2011041338 A2    4/2011
WO    WO 2012/047144    4/2012

OTHER PUBLICATIONS

PCT Written Opinion of the International Searching Authority for International Application No. PCT/SE2012/050570, May 27, 2013.
(Continued)

*Primary Examiner* — Paul H Masur
(74) *Attorney, Agent, or Firm* — Patents on Demand P.A.; Brian K. Buchheit; Scott M. Garrett (57) ABSTRACT

The disclosure relates to a network node $2_1$, $2_n$; $3_1$, $3_n$ of a communication system 1 for wireless communication. The network node $2_1$, $2_n$; $3_1$, $3_n$ is configured to utilize a first bandwidth, $B_1$, allocated in accordance with a first communication standard, wherein a first carrier and a second carrier are allocated within the first bandwidth $B_1$. The first carrier has a first bandwidth, $B_{legacy}$, and is configured to operate in accordance with a transmission format of the first communication standard, and the second carrier has a second bandwidth, $B_{non-legacy}$, and is configured to operate in accordance with a transmission format of a second communication standard.

13 Claims, 9 Drawing Sheets

(51) Int. Cl.
*H04W 4/06* (2009.01)
*H04L 12/18* (2006.01)

(56) References Cited

U.S. PATENT DOCUMENTS

2012/0026929 A1* 2/2012 Wang et al. .................. 370/312
2012/0113831 A1* 5/2012 Pelletier et al. .............. 370/252
2013/0163529 A1* 6/2013 Chen .................... H04W 72/082
                                                              370/329
2013/0265982 A1* 10/2013 Fwu et al. ..................... 370/329

OTHER PUBLICATIONS

3GPP TSG RAN WG1 Meeting #59bis; Valencia, Spain; Title: Comparison of Carrier Segment and Extension Carrier for Contiguous Carrier Aggregation (R1-100491), Jan. 18-22, 2010.

* cited by examiner

FIG. 1
(PRIOR-ART)

METHODS AND DEVICES FOR CARRIER AGGREGATION IN A WIRELESS COMMUNICATION SYSTEM

PRIORITY

This nonprovisional application is a U.S. National Stage Filing under 35 U.S.C. §371 of International Patent Application Serial No. PCT/SE2012/050570, filed May 28, 2012, and entitled "METHODS AND DEVICES FOR CARRIER AGGREGATION IN A WIRELESS COMMUNICATION SYSTEM."

TECHNICAL FIELD

The technology disclosed herein relates generally to the field of wireless communication systems, and in particular to carrier aggregation within such wireless communication systems.

BACKGROUND

Rel-10 of Long Term Evolution (LTE) supports aggregation of multiple carriers in a communication system. With carrier aggregation, a wireless device may receive information on multiple contiguous or non-contiguous carriers on a downlink and similarly send information on multiple carriers on an uplink. In Rel-11, additional carrier types, possibly having features that are only accessible by wireless devices compliant with Rel-11 and later releases, are under study. Such carriers will be aggregated with legacy Rel-10 carriers. In Rel-10, a new carrier type has to be aggregated with a legacy carrier type.

Figure 1:
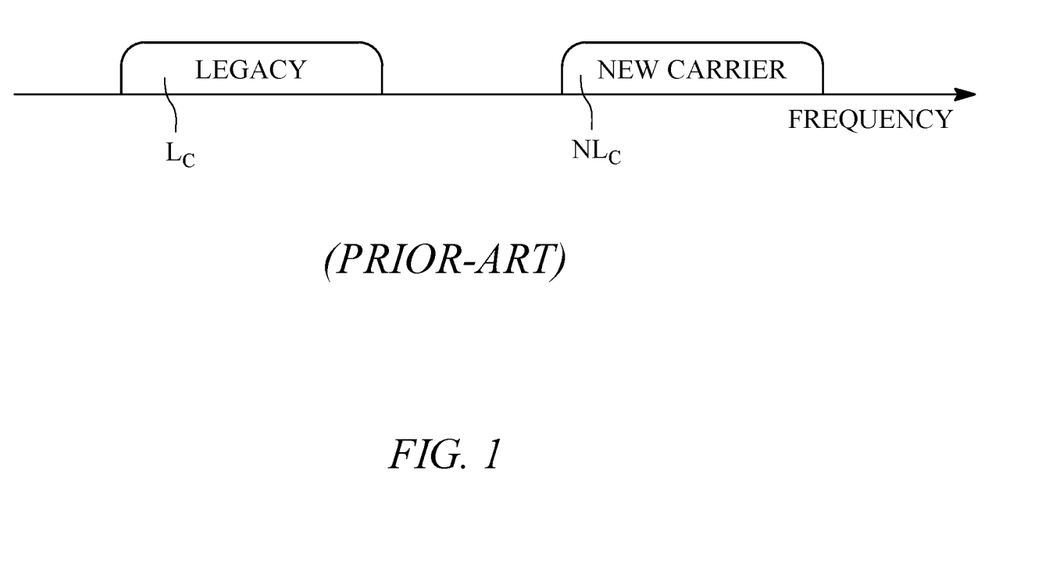
FIG. 1 illustrates non-contiguous carrier aggregation.

As illustrated in FIG. 1, it is possible to aggregate the new carrier, also denoted non-legacy carrier $NL_c$, with a legacy carrier. With such non-contiguous carrier aggregation inter component-carrier interference is reduced by virtue of the frequency separation between the two carriers. The frequency separation also enables the use of respective filters in the receiving part to further suppress interference from one component carrier onto the next.

However, one difficulty arises in that different frequency bands are typically allocated or sold to different operators. The operator may then own certain frequency bands, but may be regulated to use a certain technology, or have to fulfill certain criteria set up by e.g. International Telecommunications Union (ITU) and/or governments. For e.g. such reasons many operators do not have the proper type of spectrum for deploying such non-contiguous carrier aggregation, with e.g. a narrow band legacy carrier and a wide band non-legacy extension carrier.

Further difficulties arise when trying to meet the desire of providing backwards compatibility, e.g. when aggregating a new carrier type with a legacy carrier type. When using contiguous carrier aggregation it is important that the signals from the two component carriers reach a receiving part with approximately the same received power, otherwise the receiver cannot properly tune automatic gain control settings. Further, for e.g. LTE, wherein cyclic prefixes are used, the two component carriers must also use the same cyclic prefix length if the component carriers are to remain orthogonal, and the signals must reach the receiver with approximately the same timing. Thus, if the carriers have different cyclic prefixes, they will not be orthogonal and will thus interfere with each other.

Carrier aggregation thus entails several challenges to be overcome.

SUMMARY

An object of the invention is to overcome or at least alleviate one or more of the above mentioned problems.

The object is, according to a first aspect, achieved by a network node of a communication system for wireless communication. The network node is configured to utilize a first bandwidth allocated in accordance with a first communication standard, wherein a first carrier and a second carrier are allocated within the first bandwidth. The first carrier has a first bandwidth and is configured to operate in accordance with a transmission format of the first communication standard. The second carrier has a second bandwidth and is configured to operate in accordance with a transmission format of a second communication standard.

In an aspect, new non-backwards compatible functionality can be introduced within spectrum allocations that are already defined for operation according to the first communication standard, e.g. according to a legacy communication system standard. The introduced in-band carrier aggregation enables smooth introduction of non-legacy features with existing spectrum plans. That is, the second carrier with a second bandwidth, e.g. a non-legacy bandwidth within the legacy bandwidth, can be introduced within a frequency band owned by the operator. The first carrier, e.g. the carrier of the legacy bandwidth, may be configured for providing coverage for legacy user devices while the carrier of the non-legacy bandwidth may be configured for low-power communication with the user devices.

Further, contiguous carrier aggregation can be efficiently deployed with new non-backwards compatible carriers in e.g. a low power cell layer. Signals from legacy and non-legacy layers are received with similar, or approximately the same, power at a user device. Thereby inter-carrier interference is reduced.

The object is, according to a second aspect, achieved by a method performed in a network node of a communication system for wireless communication. The network node is configured to utilize a first bandwidth allocated in accordance with a first communication standard, wherein a first carrier and a second carrier are allocated within the first bandwidth. The method comprises utilizing the first carrier for providing access to the communication system for a user device. The first carrier has a first bandwidth, and is configured to operate in accordance with a transmission format of the first communication standard. The method further comprises utilizing the second carrier for communication with the user device. The second carrier has a second bandwidth, and is configured to operate in accordance with a transmission format of a second communication standard.

Advantages corresponding to the earlier mentioned for the network node are achieved also by such method.

The object is, according to a third aspect, achieved by a computer program for a network node of a communication system for wireless communication. The network node is configured to utilize a first bandwidth allocated in accordance with a first communication standard, wherein a first carrier and a second carrier are allocated within the first bandwidth. The computer program comprises computer program code which, when run on the network node, causes the network node to perform the steps of utilizing the first carrier for providing access to the communication system for a user device, the first carrier having a first bandwidth, and being configured to operate in accordance with a transmission format of the first communication standard, and utilizing the second carrier for communication with the user device, the second carrier having a second bandwidth and being configured to operate in accordance with a transmission format of a second communication standard.

The object is, according to a fourth aspect, achieved by a computer program product comprising a computer program as above and a computer readable means on which the computer program is stored.

Further features and advantages of the invention will become clear upon reading the following description and the accompanying drawings.

DETAILED DESCRIPTION OF EMBODIMENTS

In the following description, for purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail. Same reference numerals refer to same or similar elements throughout the description.

As used herein, "carrier bandwidth" refers to the frequency of a carrier onto which one or more signals is/are modulated. A carrier may comprise a single carrier occupying the specified bandwidth (e.g., a spread-spectrum carrier), or may comprise a plurality of subcarriers which collectively occupy the specified bandwidth.

Figure 2:
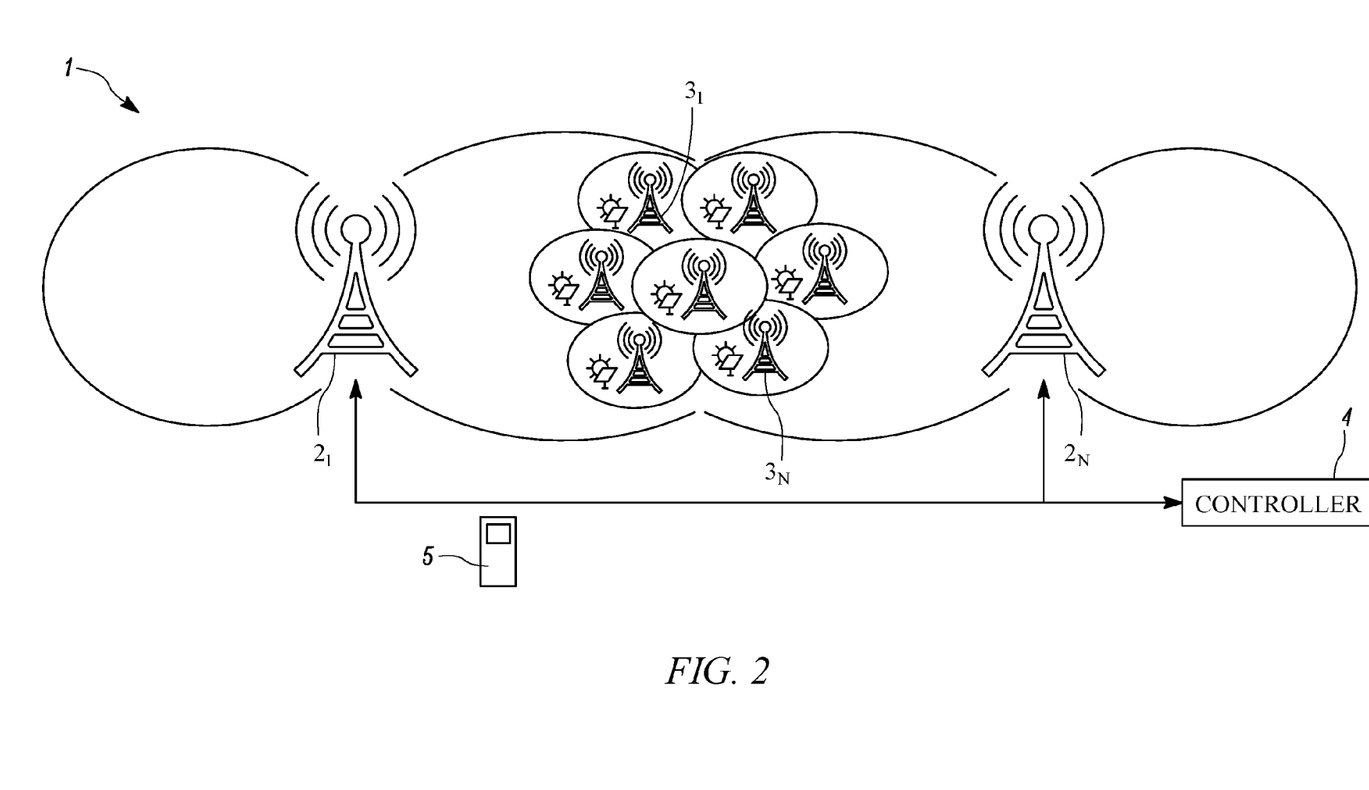
FIG. 2 illustrates schematically an environment in which embodiments of the disclosure may be implemented.

FIG. 2 illustrates schematically an environment in which embodiments of the disclosure may be implemented. In particular, FIG. 2 illustrates an exemplifying communication system architecture, wherein aspects of the present disclosure may be implemented and which may benefit from aspects of the present disclosure. The communication system 1 comprises a number of primary radio base stations $2_1, \ldots, 2_n$, e.g. eNBs, also denoted enhanced node B, in Long Term Evolution (LTE) system. In the following such primary radio base stations $2_1, \ldots, 2_n$ are denoted primary radio nodes $2_1, \ldots, 2_n$. The primary radio nodes $2_1, \ldots, 2_n$ may be implemented as remote radio units (RRUs). An RRU typically refers to a device comprising mainly radio frequency (RF) components such as antennas, filters and power amplifiers and less intelligence, i.e. less processing capabilities. The RRU is thus typically responsible for the RF functionalities. A controller 4 is then provided comprising more processing capacity and controlling the primary radio nodes $2_1, \ldots, 2_n$. The controller 4 is thus adapted to perform the rest of the functions of a typical base station such as signal processing and radio resource management. The controller 4 and the primary radio nodes $2_1, \ldots, 2_n$ connected to it may thus be considered equivalent to a base station in a cellular network, e.g. equivalent to an eNB in an LTE system as mentioned earlier.

The communication system 1 further comprises secondary radio base stations $3_1, \ldots, 3_n$. In the following such secondary radio base stations $3_1, \ldots, 3_n$ are denoted secondary radio nodes $3_1, \ldots, 3_n$. These secondary radio nodes $3_1, \ldots, 3_n$ may e.g. comprise nodes transmitting with lower transmission power than the primary radio nodes $2_1, \ldots, 2_n$ and thus having smaller range. The primary radio nodes $2_1, \ldots, 2_n$ and the secondary radio nodes $3_1, \ldots, 3_n$ may thus constitute a heterogeneous network (HetNet).

The communication system 1 serves a number of user devices 5 located within a coverage area of any of the primary radio nodes $2_1, \ldots, 2_n$ and/or secondary radio nodes $3_1, \ldots, 3_n$. The user device 5 may be any wireless device, able to communicate over a radio interface. The communication system 1 may serve different types of user devices: user devices operating according to a first communication standard, user devices operating according to a second communication standard, user devices able to operate in both communication standards, and/or user devices operating according to one of the communication standards and also partly in accordance with the other communication standard. The first communication standard may for example be a legacy system and the second communication standard may be a non-legacy system. As a particular example, the first communication standard may be release 10 of LTE and the second communication may be release 11 of LTE.

Using an LTE system purely as an example; LTE Rel-11 supports component carrier bandwidths of 1.4, 3, 5, 10, 15, and 20 MHz. In an aspect of the present disclosure, new bandwidths are introduced into such existing LTE standard. Thereby in-band carrier aggregation is enabled, wherein the component carriers can be deployed in different radio nodes, such as the primary radio nodes $2_1, \ldots, 2_n$ and secondary radio nodes $3_1, \ldots, 3_n$ of FIG. 2.

Figure 3:
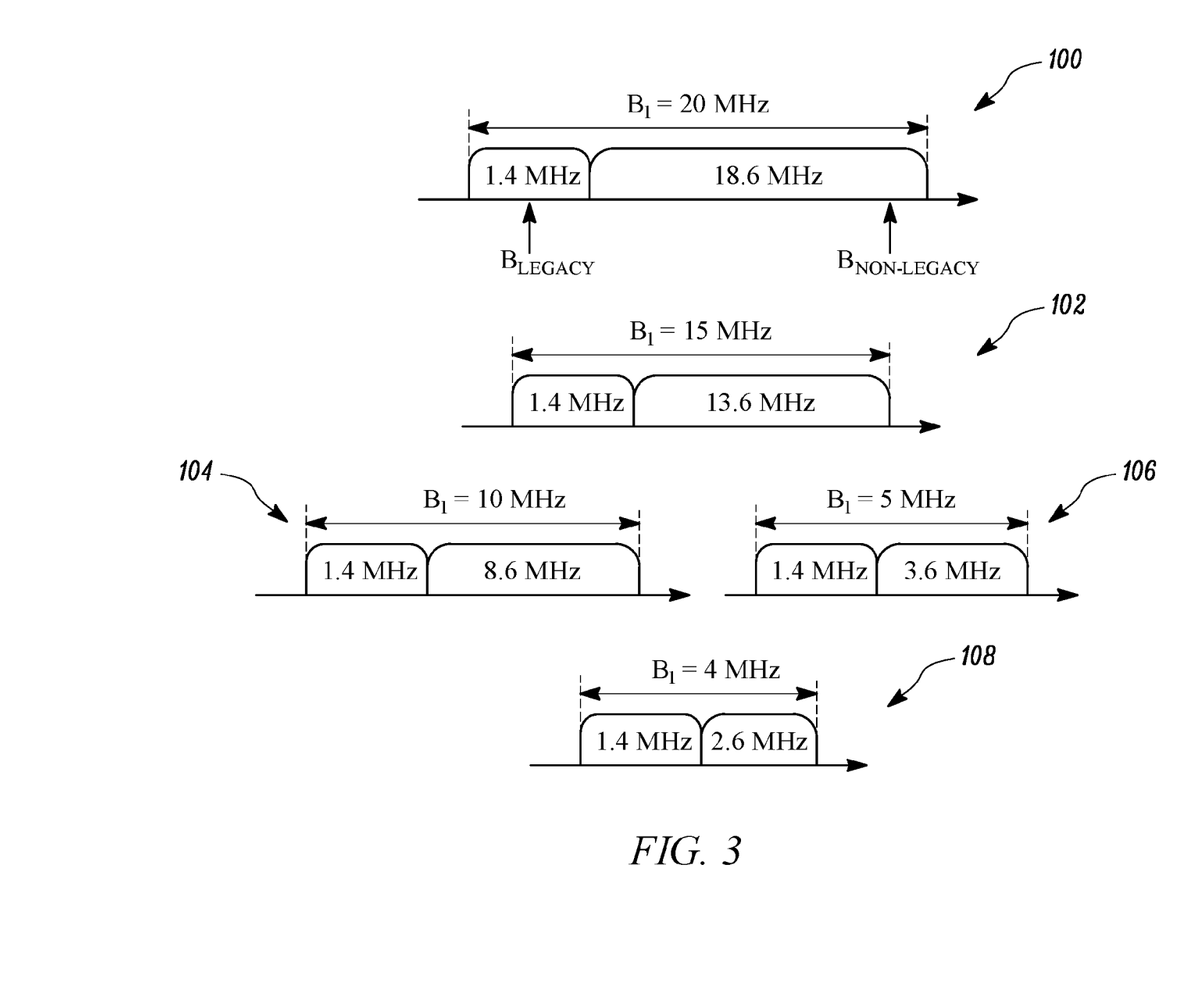
FIG. 3 illustrates several examples of legacy carrier and non-legacy carrier allocated within a legacy bandwidth.

FIG. 3 illustrates several examples of legacy carrier and non-legacy carrier allocated within a legacy bandwidth $B_1$. In particular, FIG. 3 illustrates examples on how a 1.4 MHz legacy component carrier can be combined with an 18.6, 13.6, 8.6, 3.5, or 1.6 MHz carrier inside a legacy bandwidth $B_1$ of 20, 15, 10, 5, and 3 MHz respectively. That is, at reference numeral 100, a legacy bandwidth $B_1$ of 20 MHz is illustrated. In this legacy bandwidth $B_1$, a legacy component carrier of bandwidth 1.4 MHz (indicated by $B_{legacy}$ in the figure) and a non-legacy component carrier of bandwidth 18.6 MHz (indicated by $B_{non\_legacy}$ in the figure) are combined. At reference numeral 102, a legacy bandwidth $B_1$ of 15 MHz is illustrated, comprising a legacy component carrier of 1.4 MHz combined with a 13.6 MHz non-legacy component carrier. At reference numeral 104, a legacy bandwidth $B_1$ of 10 MHz is illustrated, comprising a legacy component carrier of 1.4 MHz combined with a non-legacy component carrier of 8.6 MHz. At reference numeral 106, a legacy bandwidth $B_1$ of 5 MHz is illustrated, comprising a legacy component carrier of 1.4 MHz combined with a non-legacy component carrier of 13.6 MHz. At reference numeral 108, a legacy bandwidth $B_1$ of 3 MHz is illustrated, comprising a legacy component carrier of 1.4 MHz combined with a 1.6 MHz non-legacy component carrier. It is noted that similar combinations can be made for each legacy bandwidth. An operator that presently owns or otherwise is authorized to use such legacy bandwidth $B_1$ may thereby introduce non-legacy carriers within the available bandwidth.

These new non-legacy component carriers of different bandwidths thereby enables smooth introduction of non-legacy features with existing spectrum plans and regulations. Support for legacy user devices and emergency communication can be provided by the narrow-band legacy carrier (e.g. a 1.4 MHz primary carrier). To enable this for LTE, the legacy carrier and the new carrier could both be on the same 300 kHz frequency raster (100 kHz raster for cell search and 15 kHz sub-carrier bandwidth raster).

Figure 4:
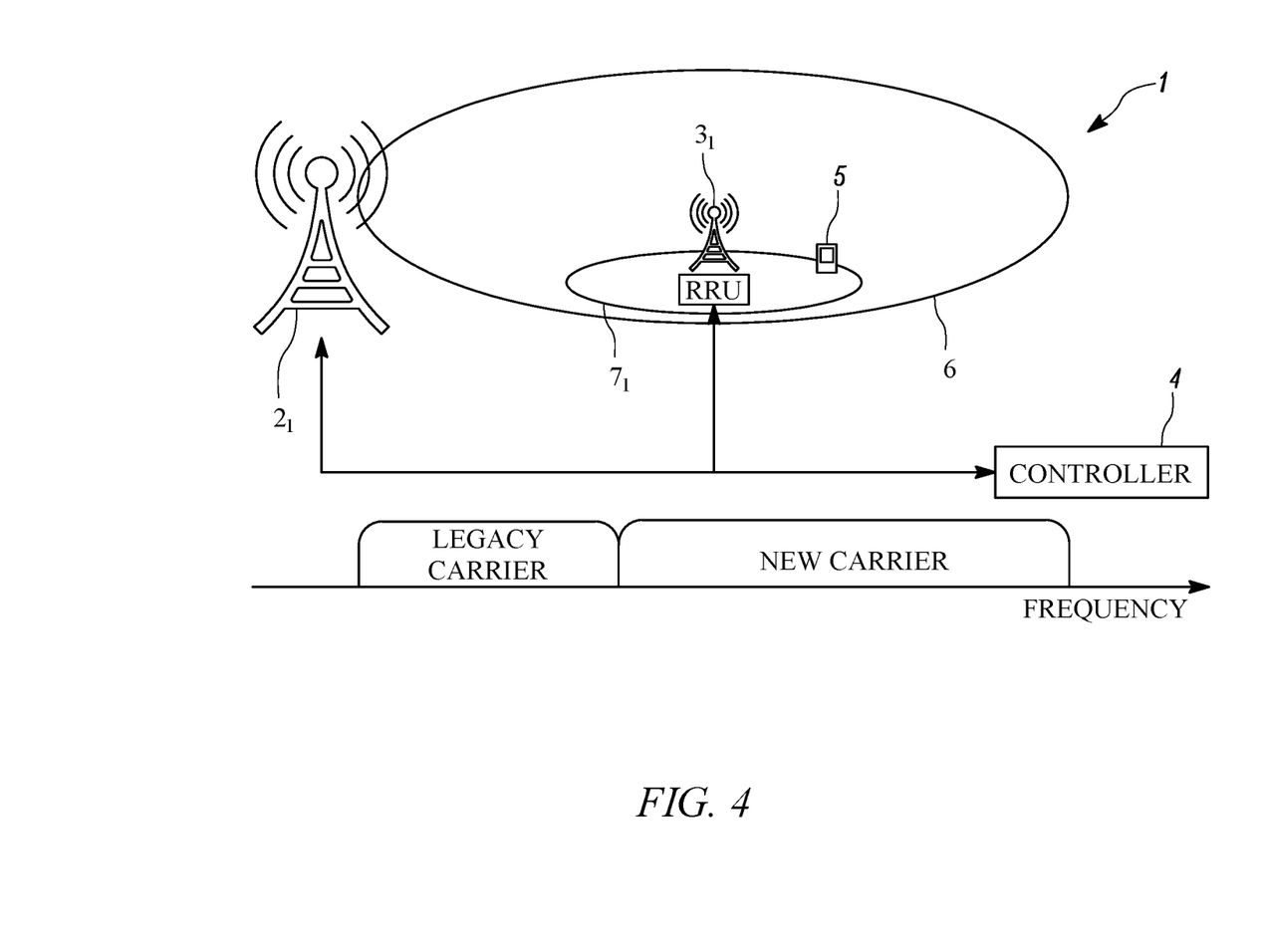
FIG. 4 illustrates an aspect of the communication system of FIG. 2.

FIG. 4 illustrates an aspect of the communication system of FIG. 2. In the communication system 1, deployment of an extension carrier may involve separating a deployment method for basic common control information from deployment method for other types of information. Essential system synchronization and control information is sent using a primary layer of sparse, higher power base stations, i.e. the multiple primary radio nodes $2_1, \ldots, 2_n$, constituting a single frequency network (SFN) where the same information is sent from the multiple primary radio nodes $2_1, \ldots, 2_n$ of the communication system 1. The primary radio nodes $2_1, \ldots, 2_n$ provides coverage for a large area and form a legacy cell 6. The primary radio nodes $2_1, \ldots, 2_n$ may transmit the information using the legacy component carrier of bandwidth $B_{legacy}$ as described in relation to FIG. 3.

Control information and data that is specific for a particular device 5 is sent using a secondary layer of radio nodes, i.e. the secondary radio nodes $3_1, \ldots, 3_n$. The secondary radio node $3_1$ provides coverage for a smaller area and form a non-legacy cell $7_1$. The secondary radio nodes $3_1, \ldots, 3_n$ may transmit the data using the non-legacy component carrier of bandwidth $B_{non\_legacy}$ as described in relation to FIG. 3.

By separating the transmission of essential system synchronization and control information from user device specific control information and data, nodes that solely convey user device specific information may be turned off whenever there is no data to send, thereby achieving power savings. Common control information could also be sent using only some of the nodes designated for such transmissions, i.e. the primary radio nodes $2_1, \ldots, 2_n$, with the particular primary radio nodes $2_1, \ldots, 2_n$ carrying the information changing over time so that some of the primary radio nodes $2_1, \ldots, 2_n$ may be turned off at any given time thus further increasing energy efficiency.

The primary layer of radio nodes $2_1, \ldots, 2_n$ (constituting an SFN) may use extended cyclic prefixes to accommodate the reception of signals from more distant radio nodes, while the data layer (i.e. the secondary radio nodes $3_1, \ldots, 3_n$) can use normal cyclic prefixes. The secondary radio nodes $3_1, \ldots, 3_n$ transmits both the new carrier and the legacy carrier and the problem of the carriers having different cyclic prefixes, as described in the background section would then occur, i.e. the carriers will not be orthogonal and will thus interfere with each other at the receiver of the receiving part, i.e. at the user device 5. One solution to this is to provide the user device 5 with a low complexity interference canceller, which can substantially improve the performance. The interference canceller should be adapted to remove interference from the legacy carrier before detecting data on the non-legacy carrier. In a particular embodiment, the interference canceller removes interference from non-data related signals transmitted from a legacy cell (e.g. provided by the radio nodes $2_1, \ldots, 2_n$). Examples of such non-data related signals comprise: common reference signals (CRS), primary synchronization signal (PSS), secondary synchronization signal (SSS), Channel State Information Reference Signal (CSI-RS), positioning reference signal (PRS), physical broadcast channel (PBCH).

If the secondary radio node $3_1, \ldots, 3_n$ only serves or has within its coverage area, user devices utilizing the non-legacy carrier, the transmission of the legacy carrier from this radio node may be deactivated. This provides a reduction in energy consumption.

When implementing the legacy carrier component using a system architecture as illustrated in FIG. 4, the legacy carrier may be configured with an extended cyclic prefix. To further enhance the energy efficiency the legacy carrier component can be equipped with up to 6 multi-broadcast single frequency network (MBSFN) sub-frames that are introduced in order to create more time for discontinuous transmission (DTX) in a downlink transmitter, thus again reducing the energy consumption of the radio node.

Figure 5:
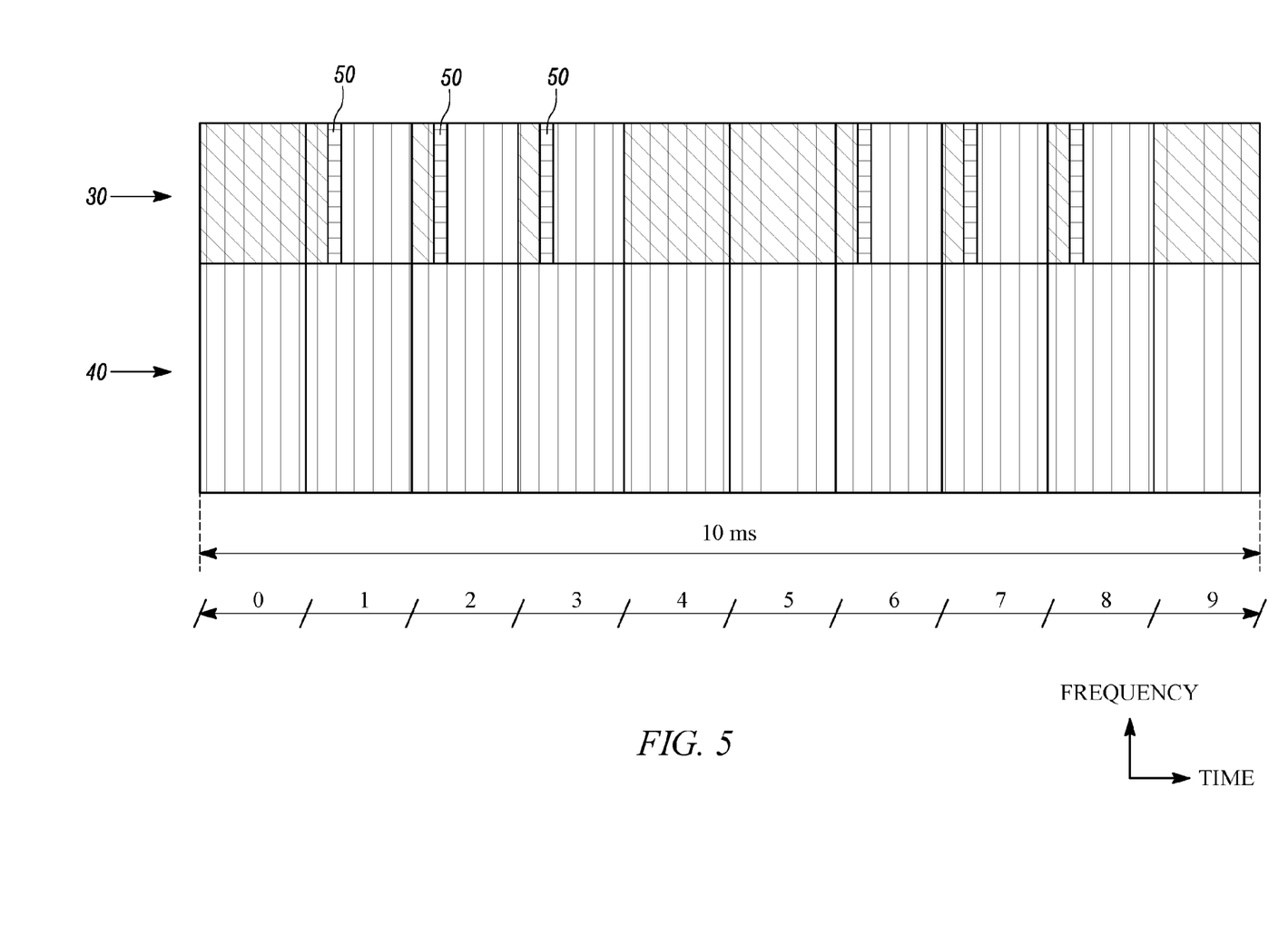
FIG. 5 illustrates an example of a new carrier using extended bandwidth in sub-frames of a legacy cell.

FIG. 5 illustrates an example of a new carrier using extended bandwidth in sub-frames of a legacy cell 6. At the horizontal axis (x-axis) time is indicated and at the vertical axis (y-axis), frequency is indicated. In LTE, a sub-frame comprises 14 Orthogonal Frequency Division Multiplexing (OFDM) symbols, in the FIG. 5 ten (10) such sub-frames are illustrated numbered 0, 1, . . . , 9, each sub-frame being 1 ms long. At arrow 30, i.e. the upper part of the figure, a legacy carrier with an extended cyclic prefix is illustrated. At arrow 40, i.e. the lower part of the figure, a non-legacy carrier with normal cyclic prefix is illustrated. The legacy carrier, having the extended cyclic prefix, has 12 OFDM symbols per sub-frame, while the non-legacy carrier, having normal cyclic prefix, has 14 OFDM symbols per sub-frame.

The sub-frames of the legacy carrier may be configured as multi-broadcast single frequency network (MBSFN) sub-frames. In FIG. 5, the legacy cell 6 is in such MBSFN mode and has almost empty sub-frames. In the particular illustrated example, sub-frames 1, 2, 3, 6, 7 and 8 are such MBSFN sub-frames, wherein two symbols are used while 10 symbols are empty. The non-legacy carrier 30 may use these empty sub-frames to extend the bandwidth of the non-legacy cell $7_1$, i.e. sub-frames 1, 2, 3, 6, 7 and 8 of the non-legacy carrier 40 may use extended bandwidth. 11 out of 14 OFDM symbols of the non-legacy carrier 40 may thus use extended bandwidth in the cell $7_1$ with the new bandwidth.

Thus, when the legacy carrier 30 is configured with MBSFN sub-frames, the non-legacy carrier 40 may be extended in the frequency domain using these sub-frames. Increased capacity is thereby provided.

The arrows indicated by reference numeral 50, illustrate small gaps that are created due to the different cyclic prefixes of the legacy carrier 30 and the non-legacy carrier 40.

The described use of extended cyclic prefixes may be used in other communication system scenarios than the one described with reference to FIG. 4. That is, also other scenarios than the described SFN set-up may benefit from the described use of extended cyclic prefixes. For example, in situations wherein a delay spread in a macro cell is very large, an extended cyclic prefix may be used for the legacy carrier, but not for the non-legacy carrier.

Figure 6A:
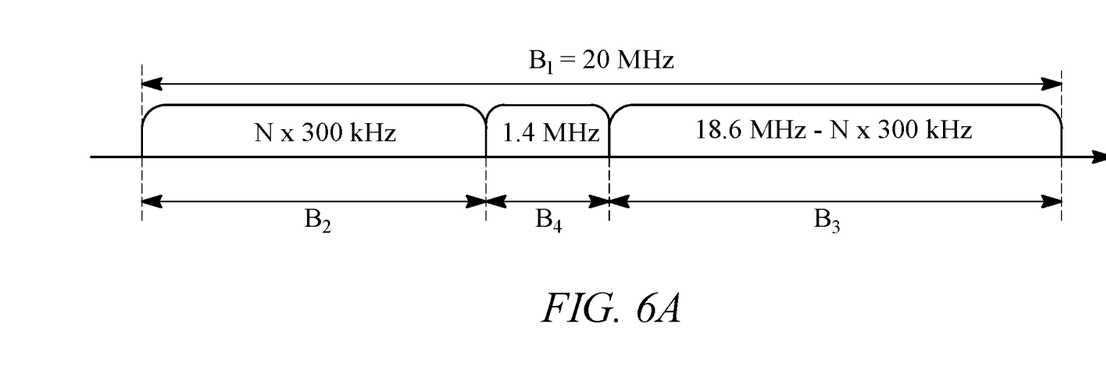
FIGS. 6a and 6b illustrate examples of non-contiguous non-legacy carrier.
Figure 6B:
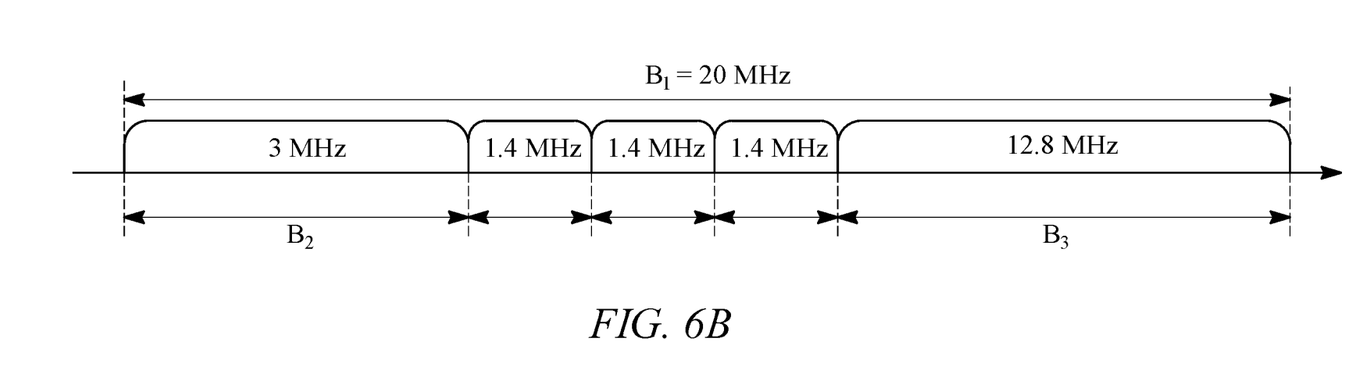
Figure 7:
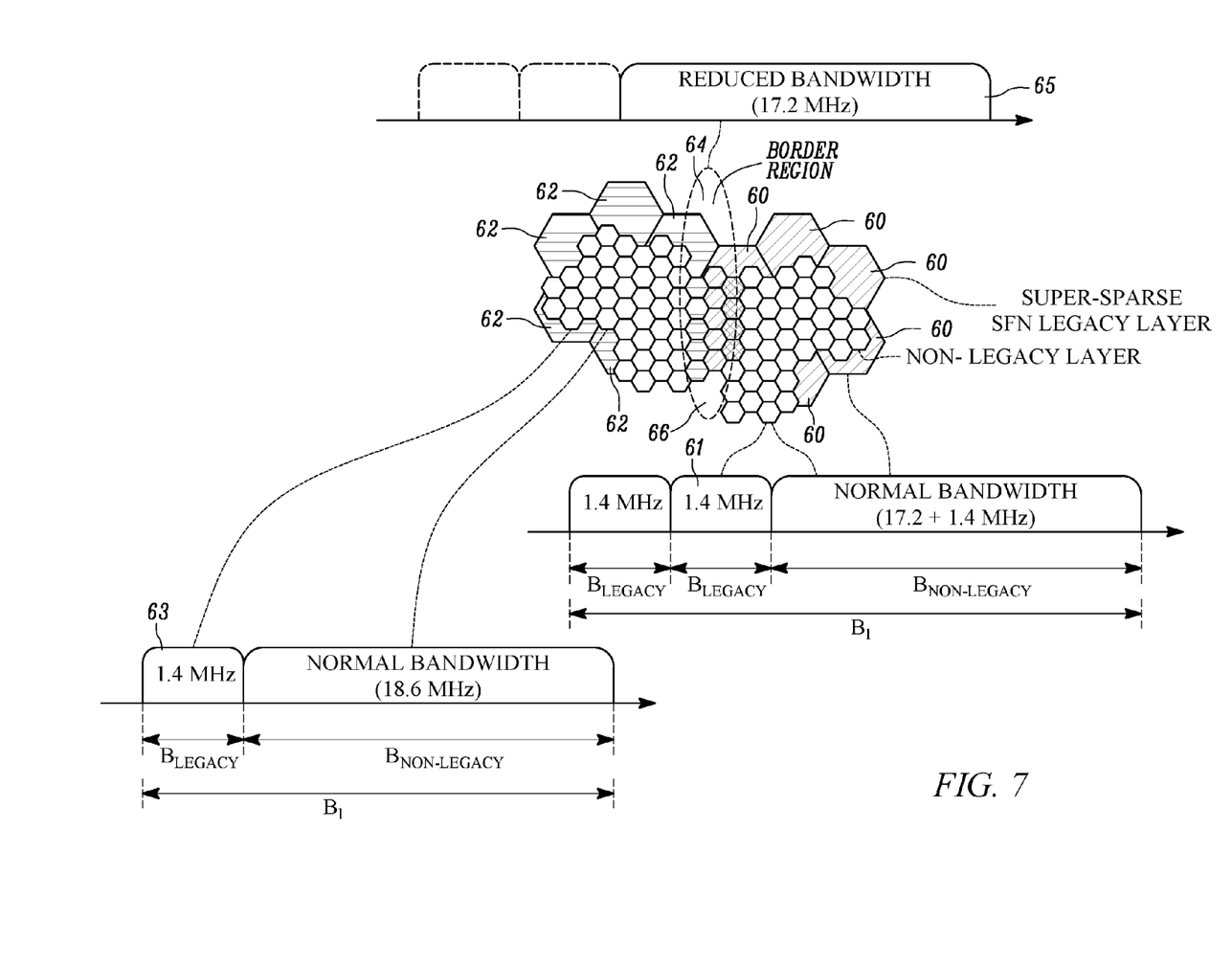
FIG. 7 illustrates an exemplary communication system deploying frequency re-use in an aspect of the disclosure.

FIGS. 6a and 6b illustrate examples of non-contiguous non-legacy carrier and FIG. 7 illustrates an exemplary communication system deploying frequency re-use in an aspect of the disclosure.

FIG. 6a illustrates a legacy bandwidth $B_1$ comprising a non-contiguous non-legacy carrier $B_2+B_3$, separated by a legacy carrier with bandwidth $B_4$. The non-legacy carrier should be viewed as one carrier, in the illustrated case of bandwidth 18.6 MHz. In the particular example illustrated in FIG. 6a, the legacy bandwidth $B_1$ equals 20 MHz, and is divided into a legacy carrier $B_4$ of 1.4 MHz separating the non-contiguous non-legacy carrier of N×300 kHz MHz ($B_2$) and 18.6 MHz–N×300 kHz ($B_3$).

In FIG. 6b, the exemplifying legacy bandwidth $B_1$ of 20 MHz is instead divided into a non-contiguous non-legacy carrier of 12.8 MHz ($B_3$ in the figure) and 3 MHz ($B_2$ in the figure). The 4.2 MHz legacy carrier is divided into three 1.4 MHz legacy carriers. The frequency resources allocated for the legacy carrier is larger than the bandwidth of the legacy carrier as defined in the standard in order to allow for frequency re-use on the legacy carrier, which will be described next.

In an embodiment, in-band frequency holes are defined, by means of which improved support for frequency re-use is enabled. With reference to FIG. 7, in coverage areas (cells) denoted by 62, a first legacy carrier 63 is deployed. In coverage areas (cells) denoted by 60, a second legacy carrier 61 is deployed. In order to avoid inter-carrier interference in a border region 66 between non-legacy cells 67, 68, the first and second legacy carriers 63, 61 are assigned different non-overlapping frequencies. The respective nodes sending the respective first and second legacy carriers 63, 61 have the same legacy bandwidth $B_1$, and the nodes thus use different parts of this legacy bandwidth $B_1$ to send the first and second legacy carriers 63, 61, respectively.

In another embodiment, in order to further reduce the inter-carrier interference in the border region 66 between the non-legacy cells 67, 68, the radio nodes of these border region cells may be configured to use a reduced non-legacy bandwidth compared to the non-legacy cells 67, 68 located outside such border region.

In the several low-power coverage areas 67 (also denoted cells 67), a non-contiguous non-legacy carrier of bandwidth $B_{non\_legacy}$ (exemplified by 18.6 MHz) is utilized, and in the several low-power coverage areas 68 (also denoted cells 68) a contiguous non-legacy carrier of the bandwidth $B_{non\_legacy}$ (i.e. the exemplified 18.6 MHz) is utilized.

In the figure the two layers of radio nodes, i.e. the multiple primary radio nodes $2_1, \ldots, 2_n$, constituting a single frequency network (SFN) and the secondary radio nodes $3_1, \ldots, 3n$ mentioned earlier in relation to FIG. 4 are indicated by "super-sparse SFN legacy layer" and "Non-legacy layer", respectively.

Figure 8:
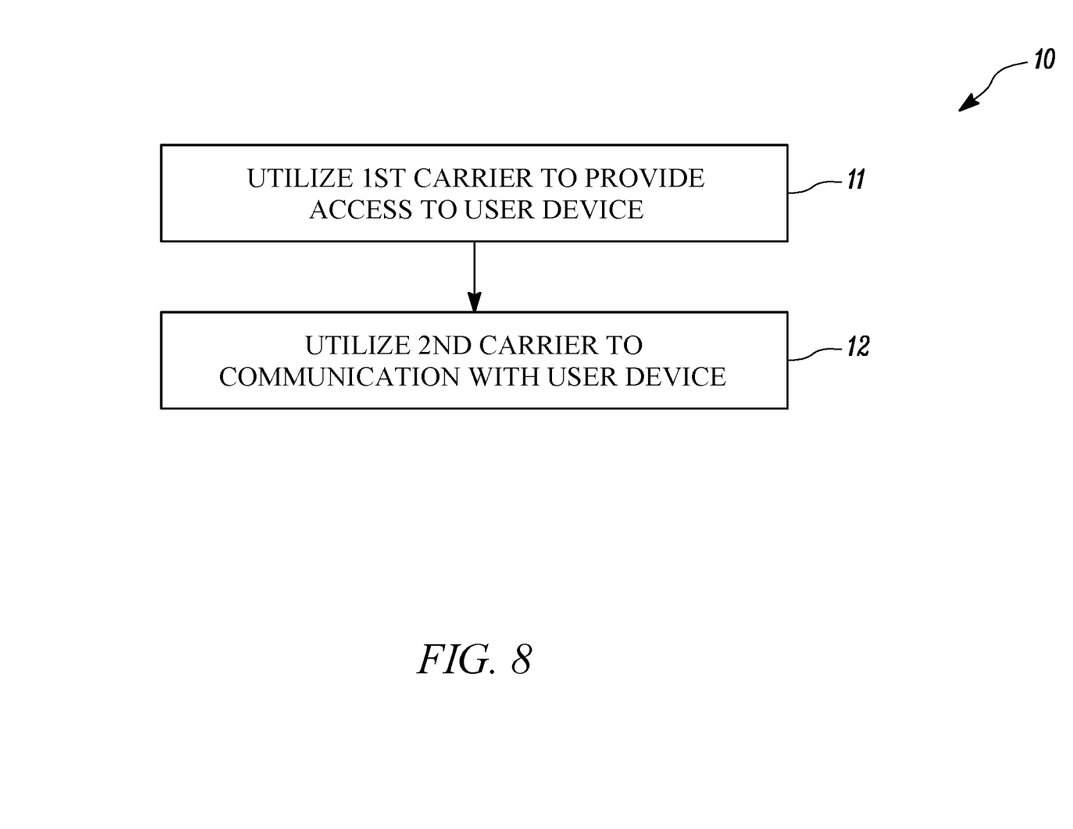
FIG. 8 is a flow chart over a methods implemented in a network node.

FIG. 8 is a flow chart over a methods implemented in a network node. The method 10 is performed in a network node $2_1, \ldots, 2_n; 3_1, \ldots, 3_n$ of a communication system 1 for wireless communication, such as the one described in relation to FIG. 2. That is, the network node $2_1, \ldots, 2_n; 3_1, \ldots, 3_n$ is configured to utilize a first bandwidth, $B_1$, allocated in accordance with a first communication standard. Within this first bandwidth $B_1$, a first carrier and a second carrier are allocated. The method 10 comprises utilizing 11 the first carrier for providing access to the communication system 1 for a user device 5. The first carrier has a first bandwidth, $B_{legacy}$, and is configured to operate in accordance with a transmission format of the first communication standard.

The method 10 further comprises utilizing 12 the second carrier for communication with the user device 5. That is, the second carrier is used for providing the communication means for the user device 5, a channel over which it communicates data. The second carrier may thus be seen as providing the user device 5 with capacity. The second carrier has a second bandwidth, $B_{non\text{-}lebacy}$ and is configured to operate in accordance with a transmission format of a second communication standard.

In an embodiment, the first carrier is configured with a multicast broadcast single frequency network sub-frame (MBSFN sub-frame). The method 10 comprises turning off power amplifiers of the network node $2_1, \ldots, 2_n; 3_1, \ldots, 3_n$ during empty symbols of at least one MBSFN sub-frame.

In an embodiment, the utilizing 11 of the first carrier for providing access comprises utilizing the first carrier for transmitting system synchronization and/or control information.

In an embodiment, the utilizing 12 the second carrier for communication comprises utilizing the second carrier for transmitting control information and/or data intended for a particular user device 5.

Figure 9:
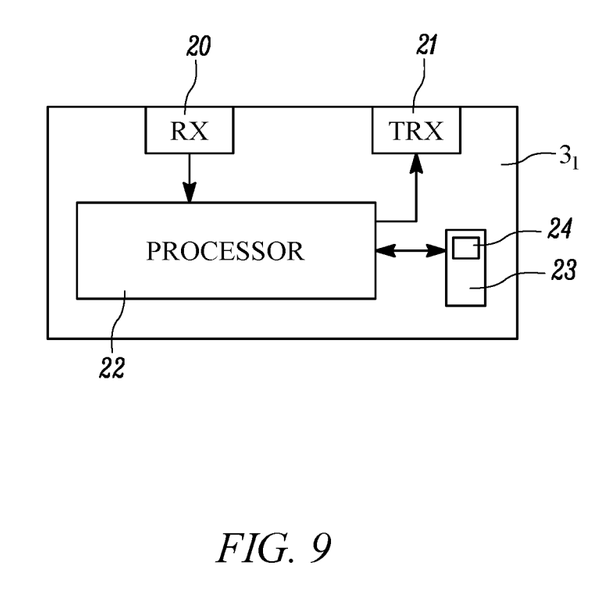
FIG. 9 illustrates an exemplifying network node comprising means for implementing embodiments of the methods.

FIG. 9 illustrates an exemplifying network node comprising means for implementing embodiments of the methods. In particular, the methods as described in relation to FIG. 8 may be implemented in a network node $2_1, \ldots, 2_n; 3_1, \ldots, 3_n$ of a communication system 1 for wireless communication, such as the radio nodes described in relation to FIG. 2.

The network node $2_1, \ldots, 2_n; 3_1, \ldots, 3_n$ comprises receiver unit 20 and transmitter unit 21 for receiving and transmitting radio signaling and typically also various other components, not illustrated, such as modulator, encoder, decoder, antennas, radio front end circuitry etc.

The network node $2_1, \ldots, 2_n; 3_1, \ldots, 3_n$ comprises a processing unit 22. The processing unit 22 may for example be a central processing unit (CPU), microcontroller, digital signal processor (DSP), etc., capable of executing software instructions, e.g. a computer program 24, stored in a computer program product 23 e.g. in the form of a memory. The processing unit 22 is thus able to retrieve data and/or instructions from such computer program product 23.

The network node $2_1, \ldots, 2_n; 3_1, \ldots, 3_n$, and particularly the processing unit 22 thereof, is configured to utilize a first bandwidth, $B_1$, allocated in accordance with a first communication standard, wherein a first carrier and a second carrier are allocated within the first bandwidth $B_1$. The first carrier has a first bandwidth, $B_{legacy}$, and is configured to operate in accordance with a transmission format of the first communication standard, and the second carrier has a second bandwidth, $B_{non\text{-}lebacy}$, and is configured to operate in accordance with a transmission format of a second communication standard.

In an embodiment, the first carrier is configured with an extended cyclic prefix.

In an embodiment, the first carrier is configured with a multicast broadcast single frequency network sub-frame (MBSFN sub-frame) pattern. In a variation of this embodiment, the second carrier is configured to use extended bandwidth in at least one such MBSFN sub-frame. In a particular embodiment thereof, the second carrier is extended in frequency domain during at least one such MBSFN sub-frame.

In an embodiment, the second carrier is configured with a resource block with a time-variable bandwidth.

In an embodiment, the first carrier is configured for transmission of system synchronization and/or control information.

In an embodiment, the second carrier is configured for transmission of control information and/or data intended for a particular user device 5.

In an aspect, a computer program 24 is provided for the network node $2_1, \ldots, 2_n; 3_1, \ldots, 3_n$. The computer program 24 comprises computer program code for cooperation with the processing unit 22. A computer program product 23 may be provided comprising the computer program 24 and computer readable means on which the computer program 24 is stored.

The computer program 24 comprises computer program code which, when run on the network node $2_1, \ldots, 2_n; 3_1, \ldots, 3_n$, in particular the processing unit 22 thereof, causes the network node $2_1, \ldots, 2_n; 3_1, \ldots, 3_n$ to perform the steps of: utilizing the first carrier for providing access to the communication system 1 for a user device 5, the first carrier having a first bandwidth, $B_{legacy}$, and being configured to operate in accordance with a transmission format of the first communication standard, and utilizing the second carrier for communication with the user device 5, the second carrier having a second bandwidth, $B_{non-lebacy}$, and being configured to operate in accordance with a transmission format of a second communication standard.

In an aspect of the disclosure, a computer program product 23 is provided. The computer program product 23 comprises a computer program 24 as described above and a computer readable means on which the computer program 24 is stored. The computer program product 23 may for example comprise any combination of read and write memory (RAM) or read only memory (ROM). The computer program product 23 may also comprise persistent storage, which, for example can be any single one or combination of magnetic memory, optical memory, or solid state memory.

The invention claimed is:

1. A network node of a communication system for wireless communication, the network node comprising a processing unit capable of executing a plurality of instructions stored in the form of a memory, wherein the processing unit is configured to utilize a first bandwidth, $B_1$, allocated in accordance with a first communication standard, wherein a first carrier and a second carrier are allocated within the first bandwidth $B_1$, and wherein
the first carrier has a first bandwidth, $B_{legacy}$, and is configured to operate in accordance with a transmission format of the first communication standard, and
the second carrier has a second bandwidth, $B_{non-legacy}$ and is configured to operate in accordance with a transmission format of a second communication standard, wherein the first carrier and the second carrier are utilized for communication with a user device, and wherein the user device is provided with an interference canceller to remove interference from the first carrier before detecting data on the second carrier.

2. The network node as claimed in claim 1, wherein the first carrier is configured with an extended cyclic prefix.

3. The network node as claimed in claim 1 wherein the first carrier is configured with a multicast broadcast single frequency network sub-frame pattern.

4. The network node as claimed in claim 3, wherein the second carrier is configured to use extended bandwidth in at least one multicast broadcast single frequency network sub-frame.

5. The network node as claimed in claim 3, wherein the second carrier is extended in frequency domain during at least one multi-broadcast single frequency network sub-frame.

6. The network node as claimed in claim 3, wherein the second carrier is configured with a resource block with a time-variable bandwidth.

7. The network node as claimed in claim 1, wherein the first carrier is configured for transmission of system synchronization and/or control information.

8. The network node as claimed in claim 1, wherein the second carrier is configured for transmission of data intended for a particular user device.

9. A method performed in a network node of a communication system for wireless communication, the network node being configured to utilize a first bandwidth, $B_1$, allocated in accordance with a first communication standard, wherein a first carrier and a second carrier are allocated within the first bandwidth $B_1$, the method comprising:
utilizing the first carrier for providing access to the communication system for a user device, the first carrier having a first bandwidth, $B_{legacy}$, and being configured to operate in accordance with a transmission format of the first communication standard, and
utilizing the second carrier for communication with the user device, the second carrier having a second bandwidth, $B_{non-legacy}$ and being configured to operate in accordance with a transmission format of a second communication standard, wherein the user device is provided with an interference canceller to remove interference from the first carrier before detecting data on the second carrier.

10. The method as claimed in claim 9, wherein the first carrier is configured with a multicast broadcast single frequency network sub-frame, the method comprising turning off power amplifiers of the network node during empty symbols of the multicast broadcast single frequency network sub-frame.

11. The method as claimed in claim 9, wherein the utilizing of the first carrier for providing access comprises utilizing the first carrier for transmitting system synchronization and/or control information.

12. The method as claimed in claim 9, wherein the utilizing the second carrier for communication comprises utilizing the second carrier for transmitting data intended for a particular user device.

13. A computer program product comprising a computer program stored in a non-transitory storage medium for a network node of a communication system for wireless communication, the network node being configured to utilize a first bandwidth, $B_1$, allocated in accordance with a first communication standard, wherein a first carrier and a second carrier are allocated within the first bandwidth B u when run on the network node, causes the network node to perform steps comprising:
utilizing the first carrier for providing access to the communication system for a user device, the first carrier having a first bandwidth, $B_{legacy}$, and being configured to operate in accordance with a transmission format of the first communication standard, and
utilizing the second carrier for communication with the user device, the second carrier having a second bandwidth, $B_{non-legacy}$ and being configured to operate in accordance with a transmission format of a second communication standard, wherein the user device is provided with an interference canceller to remove interference from the first carrier before detecting data on the second carrier.

* * * * *